(12) United States Patent
Tolentino

(10) Patent No.: US 10,117,513 B1
(45) Date of Patent: Nov. 6, 2018

(54) PORTABLE CHAFING AND SERVING TABLE

(71) Applicant: Grant M. J. Tolentino, Kaneohe, HI (US)

(72) Inventor: Grant M. J. Tolentino, Kaneohe, HI (US)

( * ) Notice: Subject to any disclaimer, the term of this patent is extended or adjusted under 35 U.S.C. 154(b) by 542 days.

(21) Appl. No.: 14/056,511

(22) Filed: Oct. 17, 2013

(51) Int. Cl.
| A23C 3/02 | (2006.01) |
| A47J 36/36 | (2006.01) |
| A47B 31/04 | (2006.01) |
| A47B 31/02 | (2006.01) |
| A47J 39/02 | (2006.01) |

(52) U.S. Cl.
CPC .............. *A47B 31/04* (2013.01); *A47B 31/02* (2013.01); *A47J 39/02* (2013.01)

(58) Field of Classification Search
None
See application file for complete search history.

(56) References Cited

U.S. PATENT DOCUMENTS

| 1,464,889 | A | | 8/1923 | Stirn | |
| 2,024,259 | A | | 12/1935 | Troeber et al. | |
| 3,154,065 | A | * | 10/1964 | Bencoe | A47J 37/0713 |
| | | | | | 126/260 |
| 3,733,168 | A | * | 5/1973 | Marsh | F21V 33/00 |
| | | | | | 131/238 |
| 3,798,874 | A | * | 3/1974 | Lemelson | B65B 25/20 |
| | | | | | 53/241 |
| 4,122,780 | A | * | 10/1978 | Brickman | A47B 3/02 |
| | | | | | 108/25 |
| 4,156,449 | A | * | 5/1979 | Petersen | A47F 10/06 |
| | | | | | 160/120 |
| 4,739,580 | A | | 4/1988 | Simmons et al. | |
| 4,751,911 | A | * | 6/1988 | Betts | A47J 37/01 |
| | | | | | 126/261 |
| 4,805,076 | A | * | 2/1989 | Menter | F21S 13/00 |
| | | | | | 362/180 |
| 5,287,800 | A | * | 2/1994 | Orednick | A47F 3/14 |
| | | | | | 126/9 R |
| 5,584,283 | A | * | 12/1996 | Messina | A47J 36/24 |
| | | | | | 126/43 |
| 5,630,563 | A | * | 5/1997 | Meisner | B65H 35/002 |
| | | | | | 225/43 |
| 5,778,800 | A | | 7/1998 | Liang | |
| 5,819,640 | A | * | 10/1998 | Cuomo | A47J 27/10 |
| | | | | | 126/261 |

(Continued)

FOREIGN PATENT DOCUMENTS

FR  2646701  * 11/1990

*Primary Examiner* — Ibrahime A Abraham
*Assistant Examiner* — Gyounghyun Bae
(74) *Attorney, Agent, or Firm* — Cramer Patent & Design, PLLC; Aaron R. Cramer

(57) ABSTRACT

A portable chafing and serving table can include a foldable table assembly, a pair of leg structures pivotably connected to the table assembly, at least one chafing dish recess disposed in the table assembly, the chafing dish recess being configured to receive at least a portion of a chafing dish, and at least one food cover connected to the table assembly, the food cover being moveable between a retracted state and an extended state, and the food cover being configured to cover the chafing dish recess when in the extended state.

7 Claims, 10 Drawing Sheets

(56) References Cited

U.S. PATENT DOCUMENTS

| | | | | |
|---|---|---|---|---|
| 5,873,300 | A * | 2/1999 | Kuhlman | A47J 36/2477 126/390.1 |
| 5,915,804 | A * | 6/1999 | Crescenzo | A47B 13/16 108/187 |
| 5,964,434 | A * | 10/1999 | Lynch, Jr. | H02G 7/10 248/317 |
| 6,267,111 | B1 * | 7/2001 | Burton | B60P 3/0257 108/156 |
| 6,571,851 | B1 * | 6/2003 | Jelic | E06B 9/262 160/107 |
| 6,591,831 | B2 * | 7/2003 | Reynolds | A47J 36/24 108/118 |
| 7,047,963 | B2 * | 5/2006 | Van Vleet | F24C 3/006 126/25 R |
| 7,464,982 | B1 * | 12/2008 | Lin | B60J 11/02 296/136.01 |
| 7,516,704 | B2 * | 4/2009 | Snider | B25H 1/04 108/25 |
| 8,015,928 | B2 | 9/2011 | Chen | |
| 8,490,551 | B1 * | 7/2013 | Wagner | A47B 31/04 108/24 |
| 2003/0070591 | A1 * | 4/2003 | Shabram, Jr. | A47B 3/0912 108/35 |
| 2004/0244414 | A1 * | 12/2004 | Trinh | A61F 7/103 62/530 |
| 2005/0076795 | A1 * | 4/2005 | Riddle | A47J 36/24 99/483 |
| 2005/0115476 | A1 * | 6/2005 | Savoie | A47B 3/08 108/115 |
| 2006/0057523 | A1 * | 3/2006 | Kubicek | F23D 3/16 431/291 |
| 2006/0219580 | A1 * | 10/2006 | Lown | A47B 3/0912 206/225 |
| 2006/0242981 | A1 * | 11/2006 | Grassmuck | A47F 3/001 62/246 |
| 2007/0044667 | A1 * | 3/2007 | Steinmetz | A47J 36/24 99/483 |
| 2007/0215011 | A1 * | 9/2007 | Khan | A47B 85/06 108/11 |
| 2009/0173238 | A1 * | 7/2009 | Martinez | A47J 33/00 99/352 |
| 2011/0297334 | A1 * | 12/2011 | Bohlen | E06B 9/62 160/310 |
| 2012/0204765 | A1 * | 8/2012 | Khanjian | A47B 3/087 108/28 |
| 2012/0279429 | A1 * | 11/2012 | Goldszer | A47B 37/04 108/166 |
| 2014/0190709 | A1 * | 7/2014 | Stoebich | A62C 2/241 169/48 |

* cited by examiner

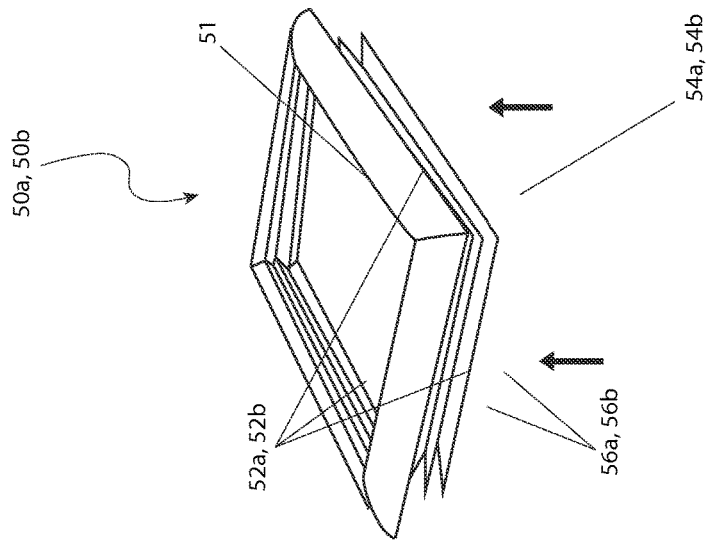
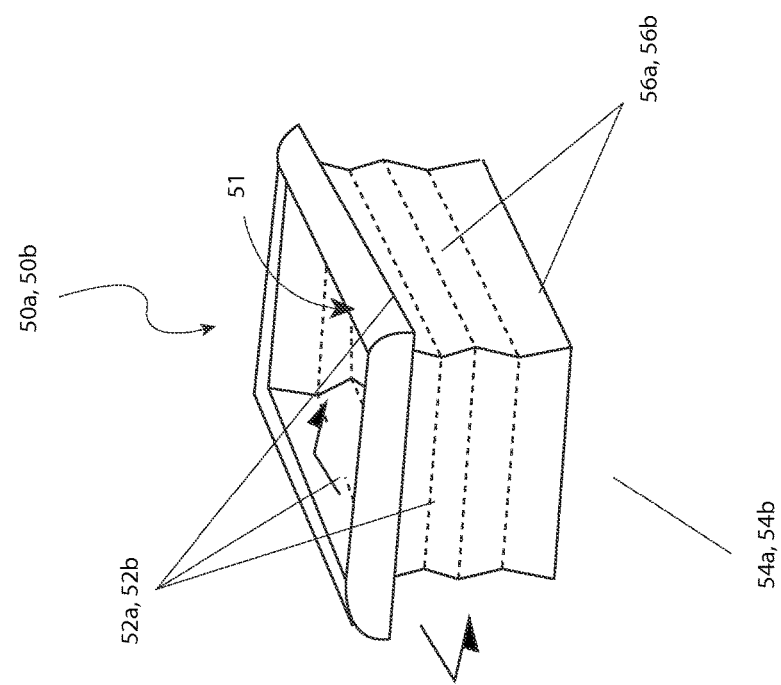
Fig. 4a
Fig. 4b

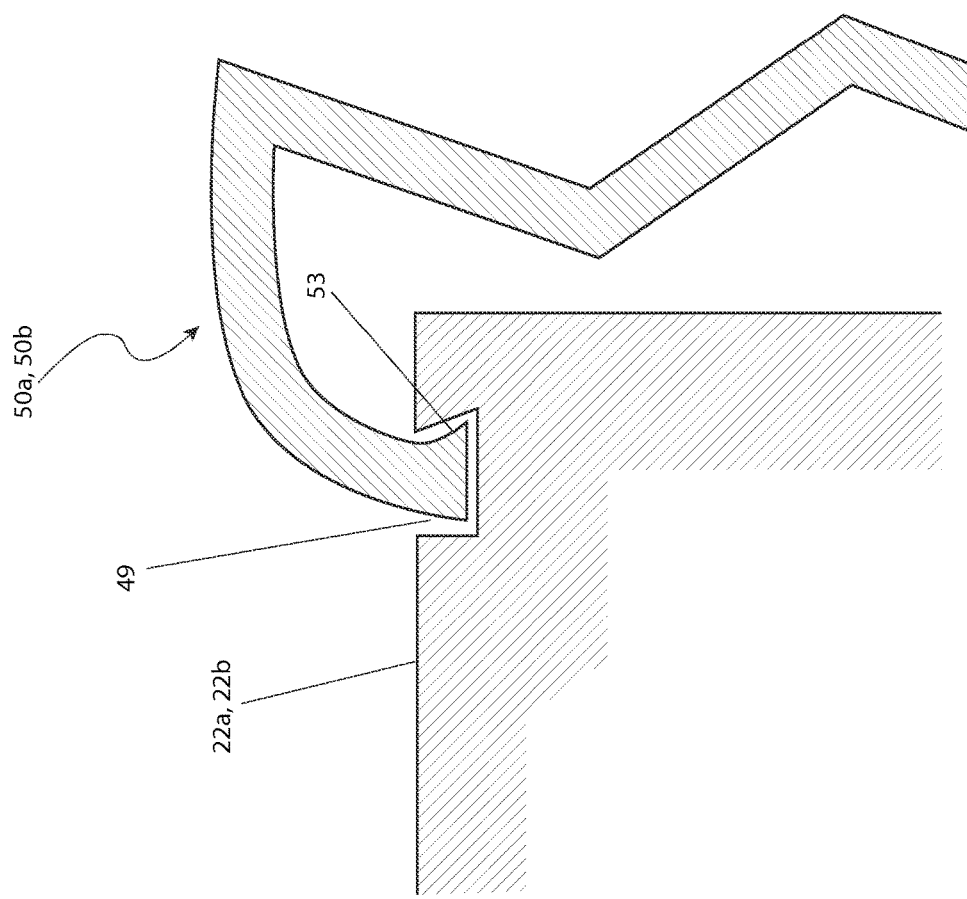

PORTABLE CHAFING AND SERVING TABLE

RELATED APPLICATIONS

Not applicable.

FIELD OF THE INVENTION

The present invention relates generally to tables, and more particularly, to a portable chafing and serving table.

BACKGROUND OF THE INVENTION

Food is often served in a serving line format at many different events and locations using portable tables. These instances can run from restaurants, banquets, outdoor parties, indoor catered events, and the like. Such food is typically provided in chafing dishes that are setup in portable stands with STERNO® cans underneath.

While such a solution works, it is difficult to keep the serving table neat. Also, the chafing dishes and stands may slide about, and even fall off of the table as guests try to scoop food out. Additionally, the exposed nature of the STERNO® cans presents a fire hazard should paper napkins or other combustibles come in contact with the open flame.

Accordingly, there exists a need for a means by which food from portable chafing dishes can be used to serve food, without the disadvantages as described above.

SUMMARY OF THE INVENTION

The inventor has recognized the aforementioned inherent problems and lack in the art and observed that there remains a need for an apparatus that provides a means for stowing, transporting, and serving foodstuffs utilizing chafing dishes. The development of the present invention, which will be described in greater detail herein, substantially departs from conventional solutions to provide a portable chafing and serving table and in doing so fulfills this need.

In one (1) embodiment, the disclosed portable chafing and serving to table can include a foldable table assembly, a pair of leg structures pivotably connected to the table assembly, at least one (1) chafing dish recess disposed in the table assembly, the chafing dish recess being configured to receive at least a portion of a chafing dish, and at least one (1) food cover connected to the table assembly, the food cover being moveable between a retracted state and an extended state, and the food cover being configured to cover the chafing dish recess when in the extended state.

In another embodiment, the disclosed portable chafing and serving table can include a table assembly including a first table panel and a second table panel, the first table panel and the second table panel being pivotably connected together by a hinge, a first leg structures pivotably connected to the first table panel, a second leg structure pivotably connected to the second table panel, at least one (1) first chafing dish recess disposed in the first table panel, the first chafing dish recess being configured to receive at least one (1) first chafing dish, at least one (1) first food cover connected to the first table panel, the first food cover being moveable between a retracted state and an extended state, and the first food cover being configured to cover the first chafing dish recess when in the extended state, at least one (1) second chafing dish recess disposed in the second table panel, the second chafing dish recess being configured to receive at least one second chafing dish, at least one (1) second food cover connected to the second table panel, the second food cover being moveable between a retracted state and an extended state, and the second food cover being configured to cover the second chafing dish recess when in the extended state, at least one (1) round container aperture disposed through at least one (1) of the first table panel and the second table panel, the round container aperture being configured to receive at least one (1) utensil cup, at least one (1) first collapsible container aperture disposed through at least one (1) of the first table panel and the second table panel, the first collapsible container aperture being configured to receive at least one first collapsible container, and at least one (1) second collapsible container aperture disposed through at least one (1) of the first table panel and the second table panel, the second collapsible container aperture being configured to receive at least one (1) second collapsible container, wherein the table assembly is foldable about the hinge for compact storage and transporting of the portable chafing and serving table.

Furthermore, the described features and advantages of the disclosed portable chafing and serving table can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 4a is a front and side perspective view of the collapsible container of the disclosed portable chafing and serving table depicted in an expanded state;

FIG. 4b is a front and side perspective view of the collapsible container of FIG. 4a depicted in a collapsed state;

FIG. 4c is a cross-sectional view, taken along section line B-B of FIG. 4a, of the collapsible container;

DESCRIPTIVE KEY

Figure 1:
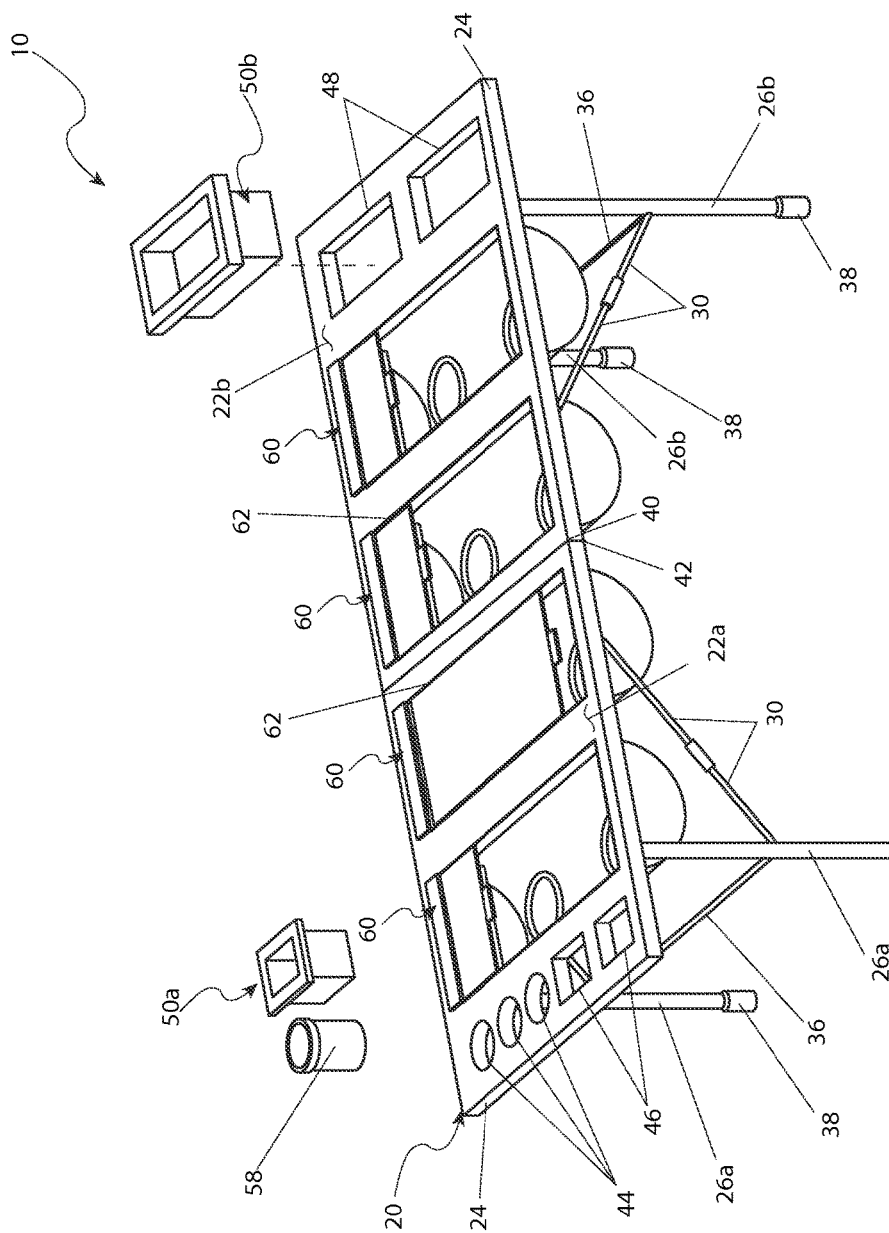
FIG. 1 is a front and side perspective view of one embodiment of the disclosed portable chafing and serving table in accordance with the present invention.

10 portable chafing and serving table
20 table assembly
22*a* first table panel
22*b* second table panel
23 handle recess
24 table border
26*a* first leg structure
26*b* second leg structure
27 leg
28 leg bracket
30 locking brace
32 locking brace fitting
34 locking brace pivot
36 stiffening rod
38 leg cap
40 table split
42 table hinge
44 round container aperture
46 first collapsible container aperture
48 second collapsible container aperture
49 attachment slot
50*a* first collapsible container
50*b* second collapsible container
51 inner space
52*a* first rim
52*b* second rim
53 latching feature
54*a* first enclosure
54*b* second enclosure
56*a* first pleat
56*b* second pleat
58 utensil cup
60 chafing dish recess
62 chafing dish aperture
64*a* food cover
64*b* cover winding mechanism
64*c* axle
65 handle
66 magnetic latch
67 groove
68 first support structure
69 fuel container ring
70 chafing dish shelf
71 slot
72 lid
74 lid hinge
76 carrying handle
77 slot
80 fastener
100 chafing dish
105 fuel container
200 alternate embodiment
203 second support structure
205 knock-out panel
207 fuel container recess

DETAILED DESCRIPTION OF THE PREFERRED EMBODIMENT

In accordance with the invention, the best mode is presented in terms of the described embodiments, herein depicted within FIGS. 1 through 6. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring to FIGS. 1-6, disclosing a portable chafing and serving table (herein described as the "apparatus") 10, where like reference numerals represent similar or like parts. The apparatus 10 can be configured to provide a specialized portable table assembly 20 having at least two collapsible leg structures 26*a*, 26*b* and enhanced features to facilitate the heating and serving of foodstuffs from one (1) or more recessed chafing dishes 100. The apparatus 10 can be configured to support a food heater, folding leg structures 26*a*, 26*b*, and a carrying handle 76 to allow for quick setup, such as at parties, social events, or anywhere a large amount of food is to be served. These features can provide a flush serving table area that is easy to keep clean, while presenting an uncluttered look. For example, the use of the disclosed apparatus 10 can provide for the ability to easily and quickly serve food at catered events.

Figure 3A:
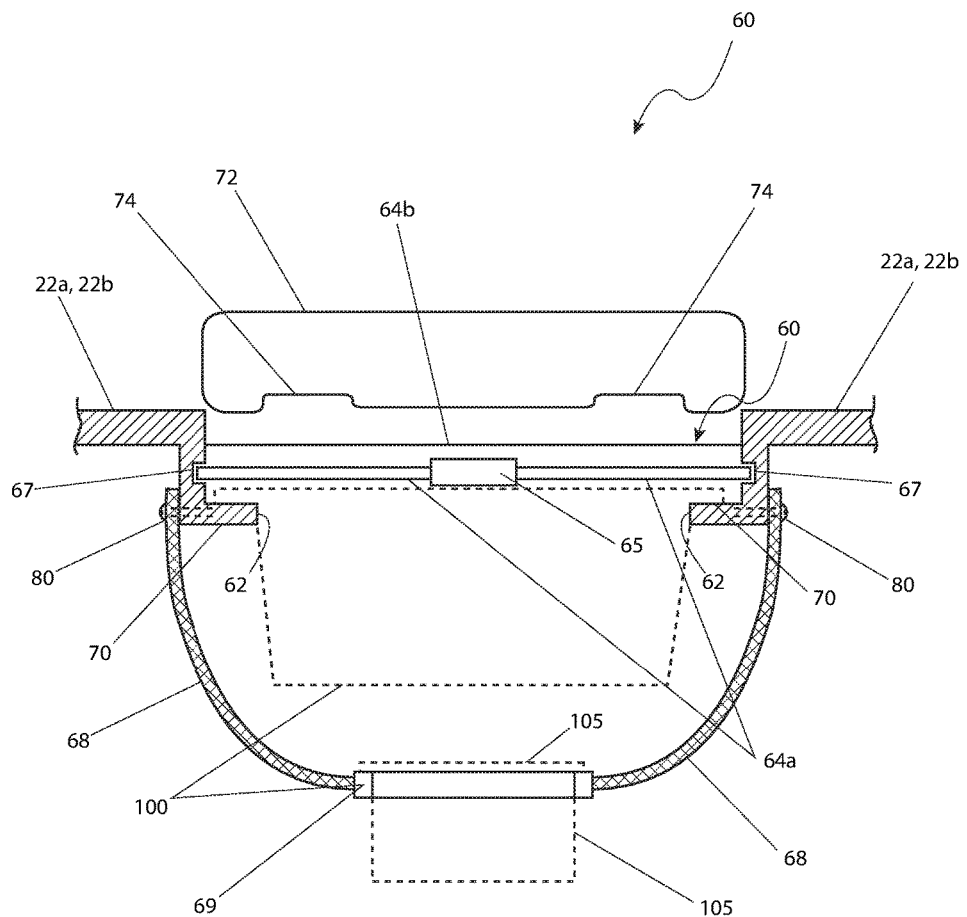
FIG. 3a is a cross-sectional view, taken along section line A-A of FIG. 2a, of the chafing dish recess.
Figure 3B:
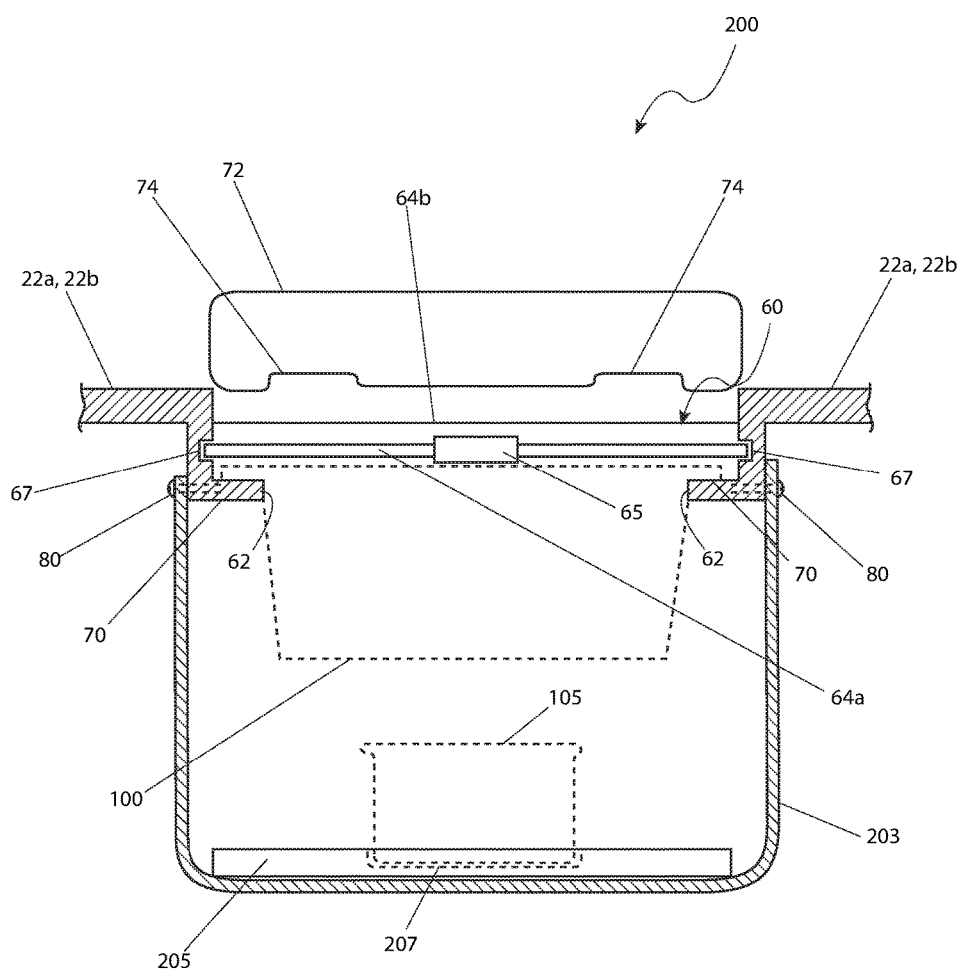
FIG. 3b is side elevational view, in section, of the support structure of another embodiment of the disclosed portable chafing and serving table.

Referring now to FIGS. 1, 3*a*, and 3*b*, the apparatus 10 can include a hinged and foldable table assembly 20, at least one (1) large chafing dish recess 60, and a pair of foldable and lockable leg structures 26*a*, 26*b*. A top surface of the table assembly 20 can include a plurality of apertures, for example, including at least one (1) large chafing dish aperture 62 configured to receive at least one (1) of the chafing dish recesses 60, at least one round container aperture 44 configured to receive at least one (1) utensil cup 58, at least one (1) first collapsible container aperture 46 configured to receive at least one first collapsible container 50a, and at least one (1) second collapsible container aperture 48 configured to receive at least one (1) second collapsible container 50b. The cups 58 and containers 50a, 50b can be utilized to hold utensils, cold foodstuffs, and other associated items.

The table assembly 20 can be configured for compact stowage and transporting via a table split 40 enabling the apparatus 10 to be folded in half. The table assembly 20 can include a first table panel 22a, a second table panel 22b, and respective integral table border features 24 disposed along one (1) or more perimeter edges. The table border 24 can extend perpendicularly downward, for example approximately two (2) inches. As an example, the table border feature 24 is disposed along and extends downwardly from a perimeter edge of the first table panel 22a and the second table panel 22b. The table border feature 24 and the first table panel 22a and the second table 22b define an interior volume when the table assembly 20 is folded into the folded configuration. The table assembly 20 can be made of materials and, optionally, contain coatings including, but not limited to; plastic, stainless steel, and the like, such as those materials in accordance with food industry standards.

The first table panel 22a and second table panel 22b can be joined together (e.g., along a bottom surface) by a table hinge 42. The table hinge 42 can extend the width of the table assembly 20 (e.g., extends laterally between longitudinal sides). The table assembly 20 can include a first leg structure 26a and a second leg structure 26b, each being connected to opposing ends of the table assembly 20. The leg structures 26a, 26b can include foldable and lockable, generally "U"-shaped members, each having two (2) downwardly extending legs 27. Each leg 27 can include respective rubber or plastic leg caps 38 connected to terminating end to protect a floor surface.

The table assembly 20 can include additional openings along the top surface including at least one container aperture 44, at least one (1) smaller first collapsible container aperture 46, and at lease one (1) larger second collapsible container aperture 48. Each round container aperture 44 can be suitably sized to receive a standard rimmed utensil cup 58 in a flush-mounted manner, which can be utilized to hold cutlery, condiments, and other items. The first 46 and second 48 collapsible container apertures can include rectangular openings being suitably sized to receive a first collapsible container 50a and a second collapsible container 50b, respectively, being supported along a rimmed edge (FIGS. 4a and 4b).

Figure 2A:
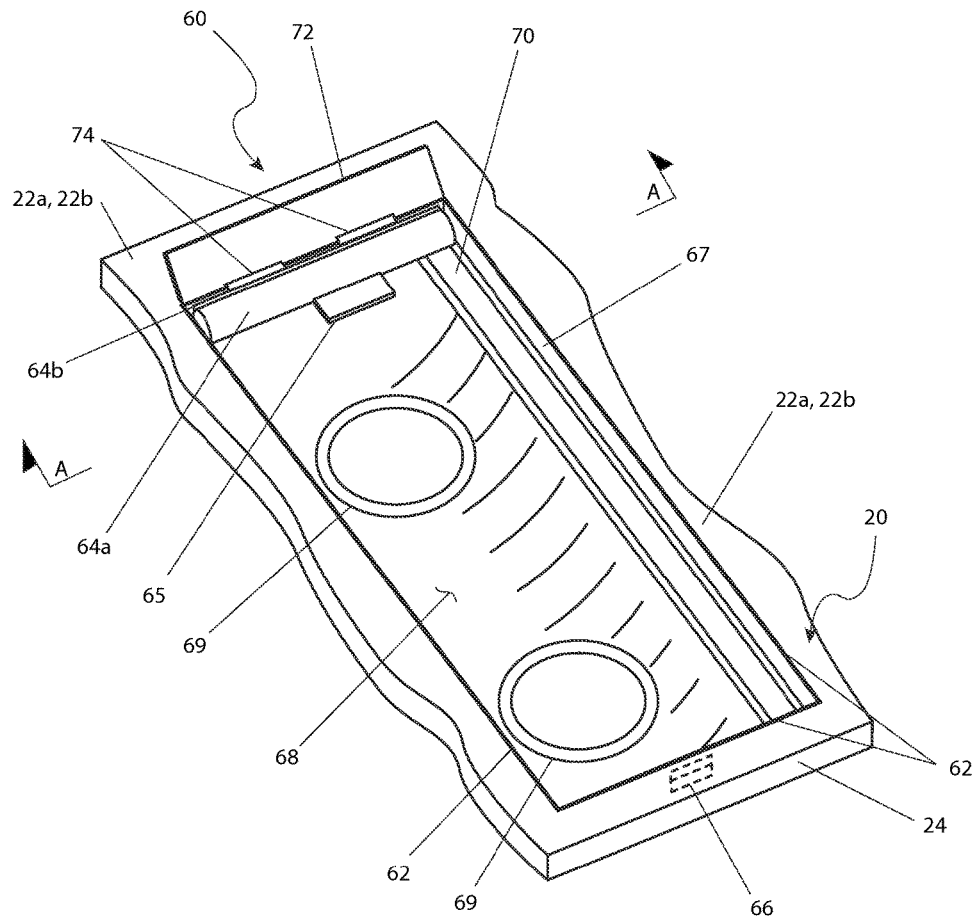
FIG. 2a is a close-up top perspective view of the chafing dish recess of the disclosed portable chafing and serving table of FIG. 1 depicted in an uncovered state.
Figure 2B:
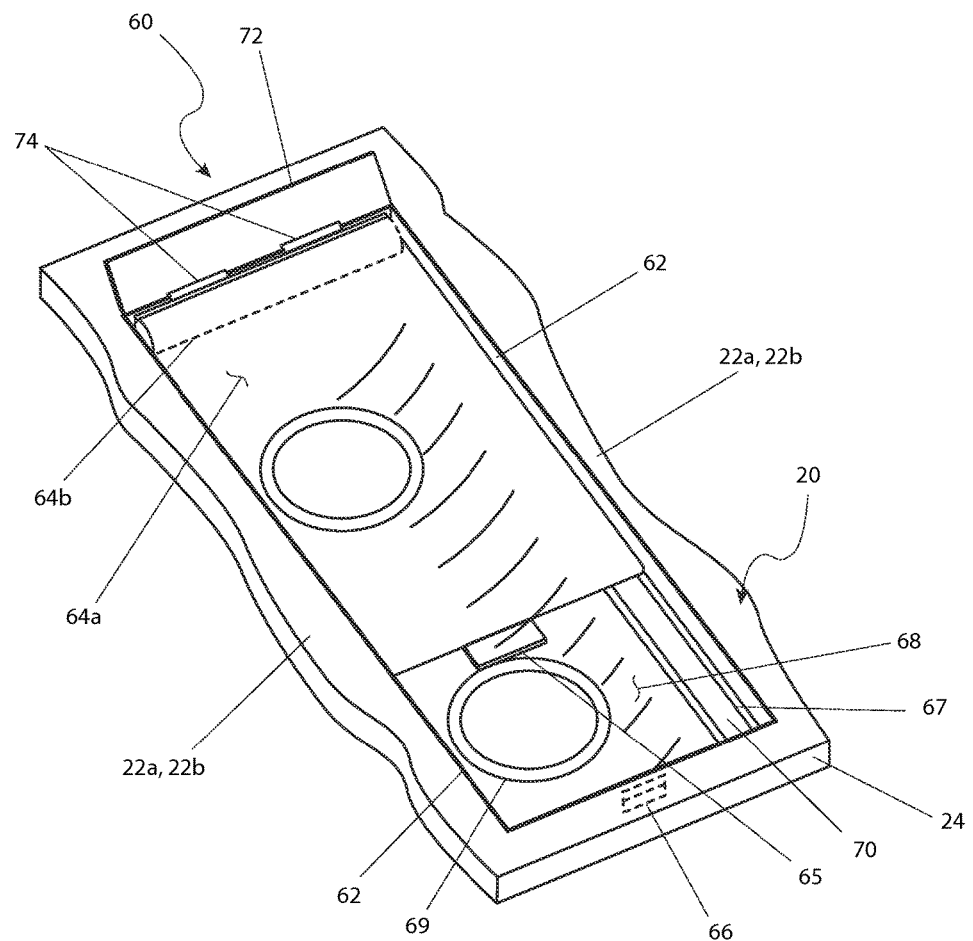
FIG. 2b is a close-up top perspective view of the chafing dish recess of FIG. 2a depicted in a partially covered state.
Figure 2C:
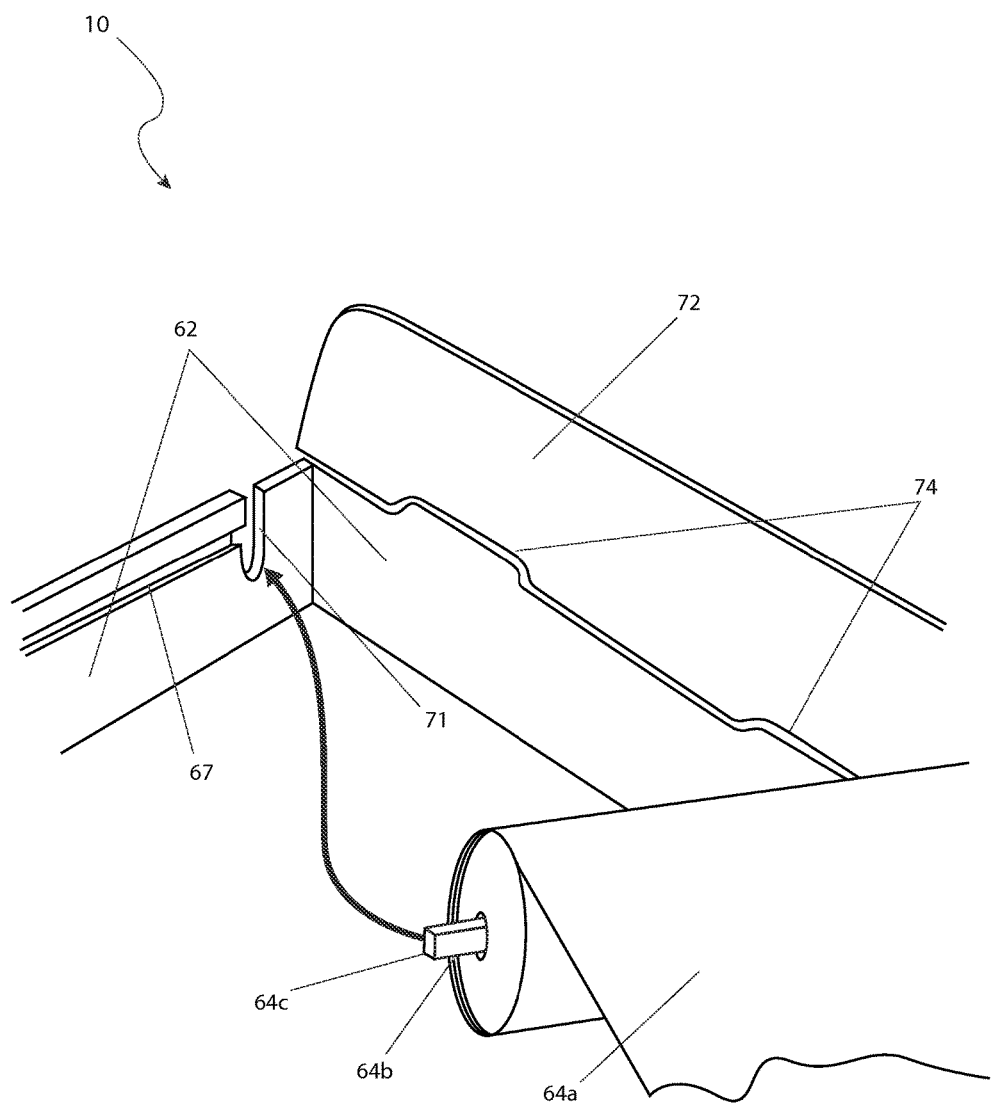
FIG. 2c is a close-up perspective view of the cover winding mechanism of the disclosed portable chafing and serving table.

Each chafing dish recess 60 can be configured to provide a support for a standard metal or foil chafing dish 100 and can include a retractable food cover 64a (FIGS. 2a and 2b), a subjacent fuel container 105 support structure 62, and a chafing dish shelf 70 onto which the chafing dish 100 can rest (FIGS. 2a, 2b).

Those skilled in the will appreciate that an actual number and arrangement of each chafing dish recess 60, round utensil containers 58, and collapsible containers 50a, 50b may vary based upon particular food service applications of the disclosed apparatus 10 and upon a user's preference without deviating from the teachings of the present disclosure and as such should not be interpreted as a limiting factor of the disclosed apparatus 10.

Referring now to FIGS. 2a, 2b, 2c, 3a, and 3b, each chafing dish recess 60 can include a chafing dish aperture 62 within the respective table panel 22a, 22b. The chafing dish recess 60 can include downwardly extending "L"-shaped chafing dish shelves 70 configured to provide features that support the protective food cover 64a, as well as support the chafing dish 100.

The food cover 64a can include an extendable and retractable thin metal or plastic sheet (e.g., film material) being horizontally deployable (e.g., by a user) across a top opening of the chafing dish recess 60. Opposing side edges of each food cover 64a can be guided horizontally within respective grooves 67 formed within opposing vertical walls of the chafing dish aperture 62 above the shelves 70. The food cover 64a can be retained in a deployed state via magnetic attachment of a metal handle 65 and a correspondingly positioned magnetic latch 66. The food cover 64a can be connected to a leading edge of the food cover 64a and the magnetic latch 66 is stationarily embedded within a forward edge of the chafing dish aperture 62. The food cover 64a can be configured to reduce heat loss and protect the food from unwanted particulate matter.

Each food cover 64a can be connected to a discreetly concealed cover winding mechanism 64b that provides spring-loaded retraction of the food cover 64a. Each cover winding mechanism 64b can include a rectangular axle 64c that protrudes outwardly from each opposing end, in turn engaging an integral vertical slot 71 in a non-rotating manner. Each slot 71 can be formed within opposing side surfaces of each chafing dish aperture 62, being located beneath the lid 72.

The cover winding mechanism 64b can be configured to provide a constant spring tension upon the food cover 64a (e.g., in a similar manner as a spring-biased window shade). The cover winding mechanism 64b can be discreetly concealed under the flush-mount hinged lid 72 also located along a rear edge of the chafing dish aperture 62.

The lid 72 can include a pair of integrally-molded lid hinges 74 disposed along a rearward edge. The lid 72 can be configured to provide a snapping interference fit into a correspondingly shaped rearward end of the chafing dish aperture 62, thereby being flush with a top surface of the table assembly 20 when in a closed position. The lid 72 can be opened to access the cover winding mechanism 64b and the attached food cover 64a for purposes of cleaning, removal, or replacement as needed.

Each chafing dish recess 60 can be configured to provide edge support to the chafing dish 100 via the opposing integral "L"-shaped chafing dish shelves 70, which protrude downwardly and inwardly from side edges of the chafing dish aperture 62. The chafing dish shelves 70 can be positioned below and parallel to the food cover 64a. In use, the chafing dish 100 can be lowered into the chafing dish recess 60 and protruding edges of the chafing dish 100 can be positioned upon the chafing dish shelves 70. The food cover 64a can then deployed and magnetically latched closed to protect the food until served.

The chafing dish shelves 70 of each chafing dish aperture 62 can be configured to provide for attachment to a flexible and collapsible textile first support structure 68 being connected to outer side surfaces of the chafing dish shelves 70 using fasteners 80 such as screws, rivets, or the like. The first support structure 68 can be made using fire-retardant treated or organic textile materials, such as NOMEX® or equivalent fabrics. The first support structure 68 can extend below the chafing dish 100 in an arcuate manner to form a horizontal surface having at least one integral fuel container ring 69.

The fuel container ring 69 can be arranged to provide even heating of the foodstuffs within the chafing dish 100. The fuel container ring 69 can be configured to support a rim of a cylindrical fuel container 105 a suitable distance from a bottom surface of the chafing dish 100. The fuel container 105 can be any commercially-available canned fuel product such as, but not limited, to a STERNO® container or equivalent.

Referring now to FIG. 3b, another embodiment of the disclosed portable chafing and serving table, generally designated 200, can include an enlarged second support structure 203 and a knock-out panel 205. The second support structure 203 can be located below each chafing dish recess 60 in lieu of the first support structure 68 and can be suitably sized to utilize the knock-out panel 205 (e.g., having been previously removed from the first 22a and second 22b table panels during fabrication of the disclosed apparatus 200) to form the chafing dish aperture 62. The second support structure 203 can be configured to provide similar attachment, materials, and function as the previously described first support structure 68 (FIG. 3a) being sized to allow the knock-out panel 205 to rest along a bottom inner surface.

The knock-out panel 205 can include at least one (1) molded-in or machined-in circular fuel container recess 207 disposed along a top surface. The fuel container recess 207 can be configured to entrap and support a bottom portion of the fuel container 105 and position the fuel container 105 at a suitable distance from the bottom surface of the chafing dish 100. Furthermore, the knock-out panels 205 can be utilized to cover the chafing dish apertures 62 when not being used to hold a chafing dish 100. Those skilled in the art will appreciate that additional knock-out panels (not shown) can be produced during fabrication of the disclosed apparatus 10, 200 during cutting of the round container apertures 44, the first collapsible container apertures 46, and the second collapsible container apertures 48 to cover respective apertures when not in use.

Referring now to FIGS. 4a, 4b, and 4c, the container apertures 44, 46, 48 of the table panels 22a, 22b can be configured to provide for removable attachment of the plurality of collapsible containers 50a, 50b along the top surface, which may hold utensils, cold foodstuffs, condiments, and other associated items. The first collapsible container 50a and second collapsible container 50b can include a respective rigid first rim 52a and second rim 52b and can be made by a plastic molding process forming an upper rectangular support frame structure around a perimeter edge of the collapsible container 50a, 50b. Each rim 52a, 52b can include integrally-molded latching features 53 disposed all around a bottom edge. The collapsible containers 50a, 50b can be removably connected to the table panels 22a, 22b via snapping connection of the latching features 53 and correspondingly shaped attachment slots 49 formed along edges of each collapsible container aperture 44, 46, 48 (FIG. 4c).

The collapsible containers 50a, 50b can include a flexible rectangular first enclosure 54a and second enclosure 54b, respectively. The enclosures 54a, 54b can be permanently affixed to inner bottom edges of the rims 52a, 52b via a plastic joining process, such as plastic molding, adhesive bonding, or other attachment methods. Each first enclosure 54a and second enclosure 54b can include a plurality of horizontal first pleats 56a and second pleats 56b, respectively, configured to allow the enclosures 54a, 54b to expand downwardly in an "accordion-style" manner to form a rectangular vessel having an inner space 51 suitably sized to receive various foods and accessory items or to collapse compactly up against the rims 52a, 52b when not being used.

Figure 5:
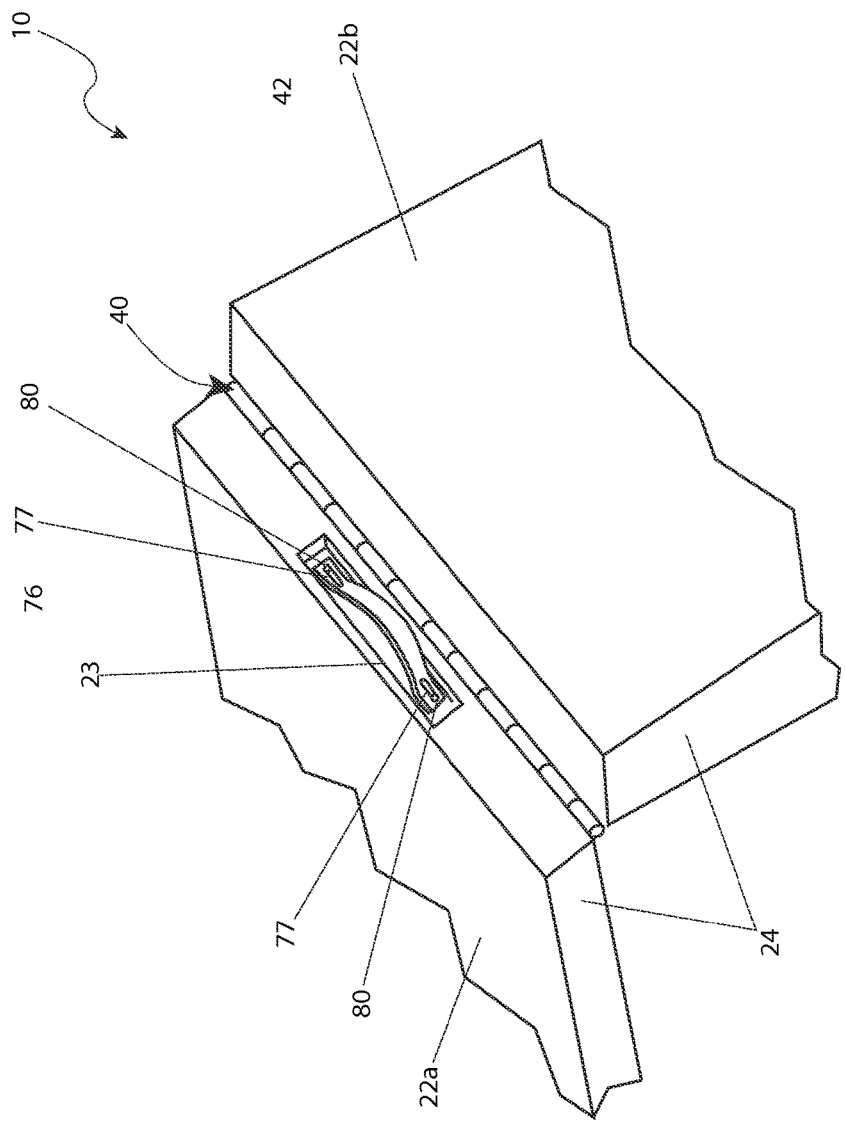
FIG. 5 is a close-up perspective view of the carrying handle of the disclosed portable chafing and serving table; and, FIG. 6 is a bottom plan view of the disclosed portable chafing and serving table depicted in the leg structures in a stowed state.

Referring now to FIG. 5, the apparatus 10 can be configured to provide for compact folding and transporting via the table hinge 42, which allows the table assembly 20 to be folded in half. The first table panel 22a and the second table panel 22b can be joined by the table hinge 42, which can extend the width of the table assembly 20 along a bottom surface of the table split 40. The table hinge 42 can be any suitable mechanical hinge mechanism (e.g., similar to a piano-type hinge) being connected to a respective first 22a and second 22b table panel, for example using a plurality of fasteners 80 (FIG. 6).

Upon folding the table panels 22a, 22b against each other, a carrying handle 76 can be accessed. The table handle 76 can be recessed within a handle recess 23 of the table border 24 of the first table panel 22a. For example, the carrying handle 76 can be a nylon strap-type handle capable of being extended outwardly from opposing slots 77, which engage respective fasteners 80, such as round-headed rivets or the like, allowing the user to insert their fingers within to carry the apparatus 10.

The collapsible functions of the previously described first support structures 68 and collapsible containers 50a, 50b enable the apparatus 10 to be folded completely with the first support structures 68 and the collapsible containers 50a, 50b to be installed and in a collapsed state, if desired (FIGS. 3, 4a, and 4b).

Figure 6:
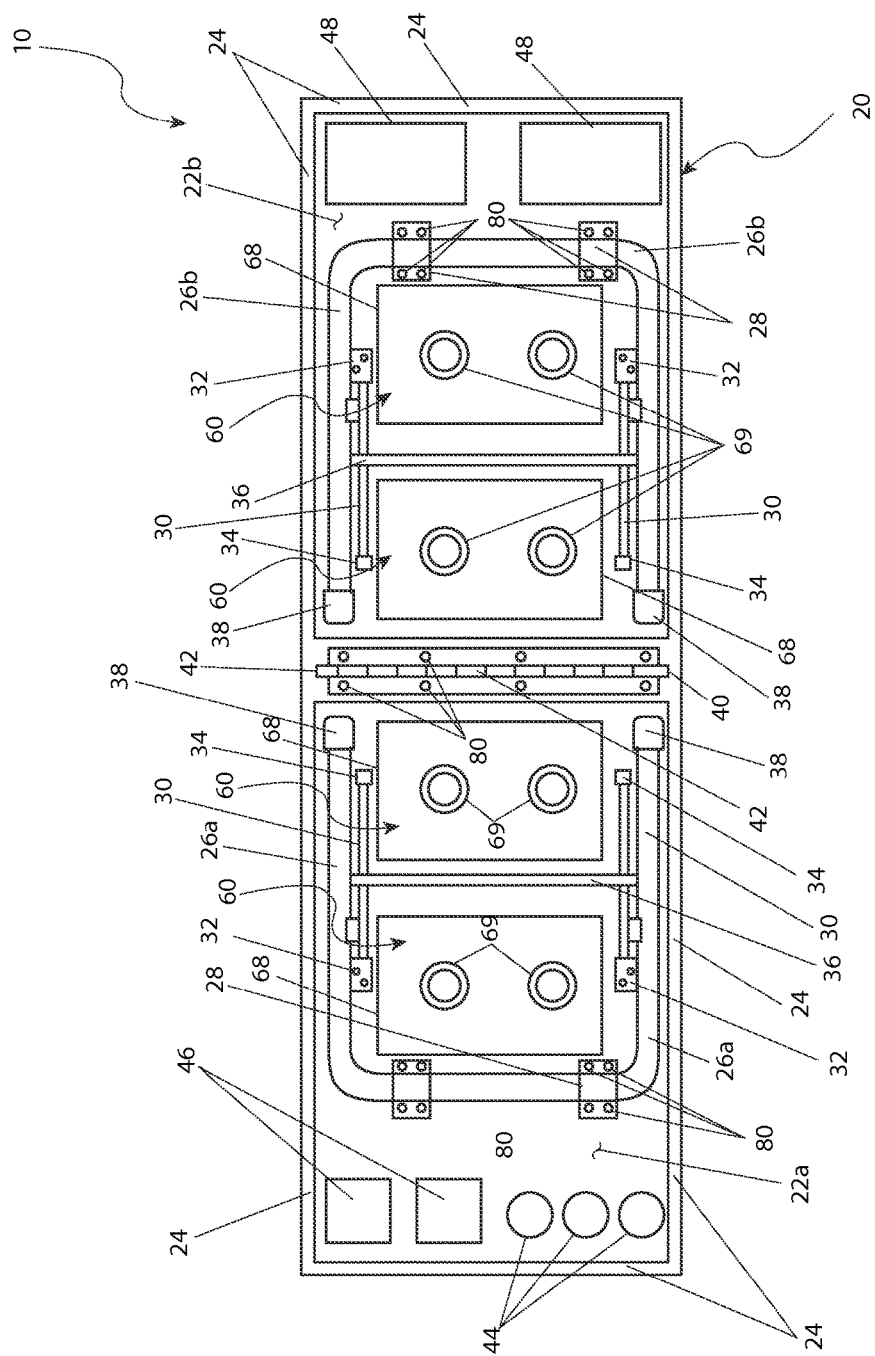

Referring now to FIG. 6, the apparatus 10 can include features configured to provide for compact storage and transporting via the previously described table hinge 42 and the folding leg structures 26a, 26b. The leg structures 26a, 26b can be made using tubular metal materials providing sufficient strength to support the apparatus 10 and an anticipated weight of food and supplies loaded onto the apparatus 10. The leg structures 26a, 26b can be secured against opposing bottom surfaces of the first table panel 22a and the second table panel 22b via respective pairs of "U"-shaped leg brackets 28 and attaching fasteners 80. The leg brackets 28 can secure the leg structures 26a, 26b to allow rotation of the leg structures 26a, 26b from a perpendicular deployed position to a parallel stowed position against the table panels 22a, 22b.

Each leg structure 26a, 26b can include an interconnecting stiffening rod 36 and a pair of locking braces 30. Each stiffening rod 36 can be rigidly welded or otherwise rigidly connected to opposing and parallel legs 27 to provide structural strength. The stiffening rod 36 can be made of similar materials as the leg structures 26a, 26b. Each leg structure 26a, 26b can be secured in a perpendicular and deployed position via the pair of to locking braces 30, which are connected at one (1) end to an intermediate portion of each leg 27 and the opposing end to the table panels 22a, 22b via a locking brace fitting 32 and attaching fasteners 80. Each locking brace 30 can include an intermediate locking brace pivot member 34 (e.g., being similar to those found on folding tables) capable of folding flat against the table panels 22a, 22b when in a stowed state.

It is envisioned that other styles and configurations of the disclosed apparatus 10 can be easily incorporated into the teachings of the present disclosure, and only certain particular embodiments have been shown and described for purposes of clarity and disclosure and not by way of limitation of scope.

In an example implementation, the user can install and utilize the example embodiments of the apparatus 10 in a simple and straightforward manner with little or no training. After initial purchase or acquisition of the apparatus 10, it can be installed and utilized as indicated in FIG. 1.

An example method for installing and preparing the apparatus 10 for a food service event can be achieved by performing the following steps: procuring a model of the apparatus 10 having desired length and width dimensions and a desired number and arrangement of round container apertures 44, container apertures 46, 48a, 48b, and chafing dish recesses 60; transporting the apparatus 10 by grasping the carrying handle 76 and carrying the apparatus 10 to a destination such as a catering event or similar food serving activity; pivoting a first table panel 22a and second table panel 22b outwardly about the table hinge 42 until in a coplanar position; pivoting the leg structures 26a, 26b outwardly until the legs 27 are perpendicular to the table panels 22a, 22b; locking the leg structures 26a, 26b in position using the locking braces 30; standing the apparatus 10 upright by placing the leg caps 38 of the legs 27 upon a floor or ground surface; inserting utensil cups 58 into the round container apertures 44; expanding the enclosures 54a, 54b of the collapsible containers 50a, 50b, if previously collapsed; inserting the collapsible containers 50a, 50b into respective collapsible container apertures 46, 48a, 48b; anchoring the collapsible containers 50a, 50b to the table panels 22a, 22b by snapping the attachment slot 49 and latching features 53 together; loading the collapsible containers 50a, 50b with utensils, cold foodstuffs, and other associated food service items; preparing a chafing dish recess 60 by retracting the food cover 64a into the cover winding mechanism 64b using the handle 65, if not previously retracted; pressing downwardly upon the first support structure 68 until fully expanded; inserting and igniting fuel containers 105 within the fuel container rings 69 of the first support structure 68, as needed to heat the foodstuffs; inserting a chafing dish 100 containing foodstuffs down into the chafing dish recess 60 until rims of the chafing dish 100 are resting upon the chafing dish shelves 70 of the chafing dish recess 60; preparing additional chafing dish recesses 60 in like manner based upon specific requirements of a food service event; and, catering and/or serving food in a portable and convenient manner afforded a user of the disclosed apparatus 10.

An example method for returning the apparatus 10 to the folded and portable state may be accomplished by removing all chafing dishes 100 and fuel containers 105 from the chafing dish recesses 60; removing the collapsible 50a, 50b and round utensil 58 containers; washing the containers 50a, 50b, 58 and surfaces of the apparatus 10, as needed; collapsing the enclosures 54a, 54b of the collapsible containers 50a, 50b and reinstalling within the collapsible container apertures 46, 48a, 48b; extending and latching the food covers 64a by attaching the handle 65 and magnetic latch 66; collapsing the first support structures 68 of the chafing dish recesses 60 against the food covers 64a; folding the locking braces 30; folding the leg structures 26a, 26b against the table panels 22a, 22b; folding the table panels 22a, 22b together; and, using the handle 76 to transport the apparatus 10 as needed.

The foregoing embodiments of the disclosed portable chafing and serving table have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen to and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. A portable chafing and serving table comprising:
a foldable table assembly comprising a first table panel and a second table panel; wherein said first table panel and said second table panel are pivotably connected together by a hinge extending between adjacent edges of said first table panel and said second table panel such that said table assembly is reconfigurable between an unfolded configuration having said first table panel and said second table panel in a coplanar relationship and a folded configuration having said first table panel and said second table panel in a parallel relationship;
a table border feature disposed along and extending downwardly from a perimeter edge of said first table panel and said second table panel, wherein said table border feature and said first table panel and said second table define an interior volume when said table assembly is folded into said folded configuration;
a first leg structure and a second leg structure pivotably connected to a respective one of said first table panel and said second table panel such that a pair of leg structures are reconfigurable between an extended configuration having said leg structures and said first table panel and said second table panel in a perpendicular relationship and a collapsed configuration having said leg structures and said first table panel and said second table panel in a parallel relationship, wherein said first leg structure and said second leg structure are housed within said interior volume of said table assembly when said table assembly is in said folded configuration and said first leg structure and said second leg structure are in said collapsed configuration;
at least one chafing dish aperture disposed through at least one of said first table panel and said second table panel, wherein said chafing dish aperture is configured to receive a lower portion of a chafing dish;
an opposed pair of chafing dish shelves disposed along and extending downwardly from a perimeter of said chafing dish aperture, wherein said chafing dish shelves are configured to support a rim of said chafing dish when received by said chafing dish aperture;
at least one support structure connected to said chafing dish shelves and hanging below said chafing dish aperture, wherein said support structure is made of a pliable textile material, wherein said support structure is configured to support at least one fuel container, and wherein said support structure compresses and is housed within said interior volume of said table assembly when said table assembly is in said folded configuration, said support structure comprising at least one fuel container aperture disposed through said pliable textile material configured to receive a lower portion of said fuel container such that said lower portion of said fuel container extends through said pliable textile material, and at least one fuel container ring extending around said fuel container aperture through said pliable textile material and configured to support a rim of said fuel container;
at least one food cover connected to at least one of said first table panel and said second table panel adjacent to said chafing dish aperture, wherein said food cover is moveable between a retracted position to expose said chafing dish and an extended position coplanar with said at least one of said first table panel and said second table panel to cover said chafing dish;

at least one round container aperture disposed through at least one of said first table panel and said second table panel, said round container aperture being configured to receive at least one utensil cup;

at least one first container aperture disposed through at least one of said first table panel and said second table panel, said first container aperture being configured to receive at least one first container; and, at least one second container aperture disposed through at least one of said first table panel and said second table panel, said second container aperture being configured to receive at least one second container;

wherein:

said first container collapses and is housed within said interior volume of said table assembly when said table assembly is in said folded configuration, further comprising:

a rigid first frame defining a perimeter first rim thereof;

a first latching feature disposed at an edge of said perimeter first rim and configured for a first interference fit within a first attachment slot formed in said at least one of said first table panel and said second table panel next to and along a perimeter edge of said first container aperture; and, a first collapsible enclosure connected to and depending downward from said perimeter first rim, said first collapsible enclosure comprising a first plurality of parallel horizontal pleats configured to allow said first collapsible enclosure to expand to define a first inner space and collapse against said perimeter first rim; and, said second container collapses and is housed within said interior volume of said table assembly when said table assembly is in said folded configuration, further comprising:

a rigid second frame defining a perimeter second rim thereof;

a second latching feature disposed at an edge of said perimeter second rim and configured for a second interference fit within a second attachment slot formed in said at least one of said first table panel and said second table panel next to and along a perimeter edge of said second container aperture; and, a second collapsible enclosure connected to and depending downward from said perimeter second rim, said second collapsible enclosure comprising a second plurality of parallel horizontal pleats configured to allow said second collapsible enclosure to expand to define a second inner space and collapse against said perimeter second rim.

2. The table of claim 1, wherein said textile material comprises a flexible fabric.

3. The table of claim 1, wherein said a textile material is fire retardant.

4. The table of claim 1, wherein said support structure comprises a plurality of walls, a bottom, and an open top defining an internal volume, wherein a lower portion of said chafing dish is received within said internal volume, and wherein said at least one fuel container aperture is disposed through said bottom and is configured to receive said lower portion of said fuel container such that said lower portion of said fuel container extends through said bottom outside of said internal volume and said at least one fuel container ring is connected to said bottom and extends around said fuel container aperture.

5. The table of claim 1, further comprising at least one knock-out panel, wherein:

said support structure comprises a plurality of walls, a bottom, and an open top defining an internal volume, wherein a lower portion of said chafing dish is received within said internal volume; and said knock-out panel is disposed within said internal volume of said support structure under said chafing dish;

said knock-out panel comprises at least one fuel container recess, and said fuel container recess is configured to partially receive said fuel container.

6. The table of claim 1, wherein said food cover comprises:

a spring-loaded winding mechanism connected to through at least one of said first table panel and said second table panel at one end said chafing dish aperture;

an elongated sheet of film material comprising a first end connected to said winding mechanism and a free second end, said sheet of film material being wound around said winding mechanism; and, a handle connected to said second end of said sheet of film material;

wherein said food cover is biased in said retracted position by said winding mechanism.

7. The table of claim 6, wherein said table assembly comprises:

a pair of opposed elongated slots extending along edges of said chafing dish recess aperture, said slots being configured to receive and guide opposing edges of said sheet of film material when said food cover is in said extended position; and, a latch disposed at an opposing end of said chafing dish aperture, said latch being configured to engage said handle when said food cover is in said expanded position.

* * * * *